Figure 1:
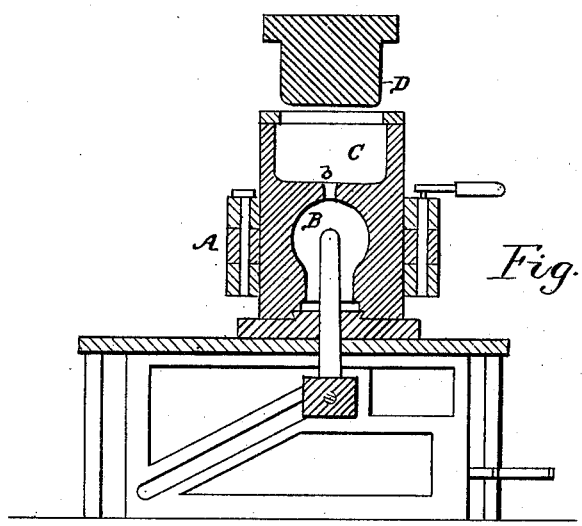

No. 756,558. PATENTED APR. 5, 1904.
J. I., C. V., F. J., F. L. & P. R. ARBOGAST.
METHOD OF MANUFACTURING GLASSWARE.
APPLICATION FILED JULY 16, 1903.
NO MODEL.

WITNESSES:
Ray McIntire
A. F. Clements

INVENTORS
John I. Arbogast
Charles V. Arbogast
Francis J. Arbogast
Frederick L. Arbogast
Philip R. Arbogast
by Connolly Bros.
ATTORNEYS No. 756,558. Patented April 5, 1904.

UNITED STATES PATENT OFFICE.

JOHN I. ARBOGAST, CHARLES V. ARBOGAST, FRANCIS J. ARBOGAST, FREDERICK L. ARBOGAST, AND PHILIP R. ARBOGAST, OF PITTSBURG, PENNSYLVANIA.

METHOD OF MANUFACTURING GLASSWARE.

SPECIFICATION forming part of Letters Patent No. 756,558, dated April 5, 1904.

Application filed July 16, 1903. Serial No. 165,845. (No model.)

*To all whom it may concern:*

Be it known that we, JOHN I. ARBOGAST, CHARLES V. ARBOGAST, FRANCIS J. ARBOGAST, FREDERICK L. ARBOGAST, and PHILIP R. ARBOGAST, citizens of the United States, residing at Pittsburg, in the county of Allegheny and State of Pennsylvania, have invented certain new and useful Improvements in Methods of Manufacturing Glassware; and we do hereby declare the following to be a full, clear, and exact description of the invention, such as will enable others skilled in the art to which it appertains to make and use the same.

Our invention has relation to methods of manufacturing glassware, and has for its object the provision of a novel method whereby the cost of production is lessened, the output increased, the services of skilled workmen dispensed with, and provision made for meeting contingencies that arise in the manufacture of and commercial handling of glassware where the old and well-known methods are in practice.

In manufacturing most classes of glass articles and after they have received their complete form it has been and still is customary to anneal them before they have lost their initial heat.

Where heretofore glass articless have been made by first molding or forming a blank with a part thereof finished or partly finished and then in a separate operation finishing the article, it has been customary, if not absolutely necessary, to reheat the glass for the second operation while it still retained a portion of its initial heat, so that it was necessary to continue work on a blank after it was once commenced—that is, without allowing the glass to become cold. To produce finished articles under such process has always required the skill and judgment of a trained glass-worker, and no provision could be made for retaining in stock or for any length of time unfinished blanks. To overcome the difficulties in the making and finishing of blanks in the one continuous operation, it has been proposed to first make a blank with a portion finished and to then anneal the blank and afterward at a convenient time reheat the blank and finish the article. It is known, however, that certain qualities of glass can be safely allowed after it has been worked to become cold without being previously annealed, and availing ourselves of the advantage of this knowledge we propose by using such glass to make blanks and then allow them to cool to normal or atmospheric temperature without annealing and to then at any desired subsequent period gradually reheat these blanks and blow or shape them to the required finished form. We propose, further, to avail ourselves of this property in glass of suitable quality to make blanks, then allow them to cool, and then to reheat a number of blanks simultaneously and in the one heating apparatus or furnace and finish them severally.

By the method which forms the subject-matter of our present application we are enabled to manufacture an extremely large range of glassware, to dispense with skilled blowers, to produce and keep in stock without annealing them an unlimited quantity of partly-finished articles or blanks which may be reheated and finished to complete form by unskilled labor when, where, and as the exigencies of the trade demand.

Our invention consists in the novel method of manufacture hereinafter described and claimed, and in carrying our invention into effect we proceed as follows:

We prepare a batch of material suitable for the production of a high grade of glass, such as may be made into certain forms and safely allowed to cool without annealing, and having melted the batch in the usual manner we make a number of blanks of size, weight, and form appropriate for the articles which are to be ultimately produced, and we allow these blanks to cool naturally to the temperature of the atmosphere, and when desirable or necessary we gradually reheat these blanks until they have assumed a condition of viscosity suitable for further working, and we then blow the blanks to completed form and finally anneal or temper them.

In the accompanying drawings we have illustrated apparatus for practicing our method, in which—

Figure 2:
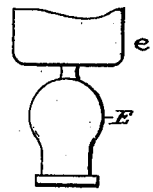
Figure 3:
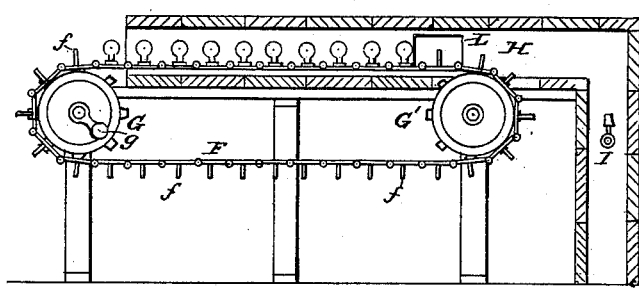
Figure 4:
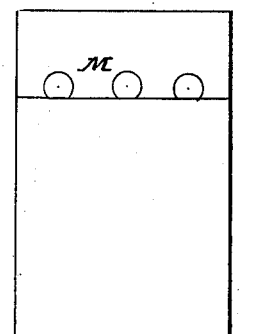
Figure 5:
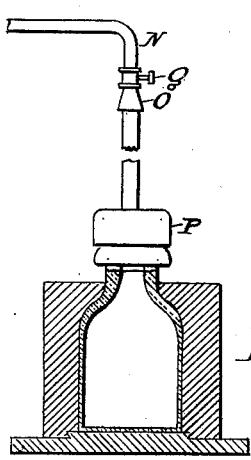
Figure 6:
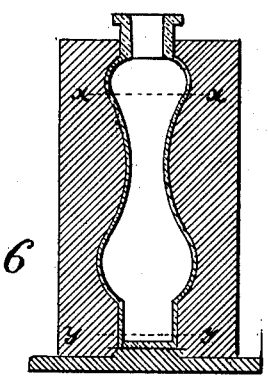

Figure 1 is a sectional view of a press-mold for making blanks. Fig. 2 is a sectional view of a blank made in the mold, Fig. 1. Fig. 3 is a vertical longitudinal sectional view of a furnace for reheating the blanks. Fig. 4 is front elevation of a glory-hole. Fig. 5 is a sectional view of a mold for blowing the reheated blanks to finished form, and Fig. 6 is a similar view of a modified form of mold.

A designates a press-mold having a cavity B of the size and form of the blank to be produced and a cup C, in which the molten glass is dropped and pressed by a plunger D through an orifice $b$ into the cavity B over a movable plug therein.

The mold A is mounted on a press-table and the plunger D attached to the cross-head of the press, and a mass of glass being dropped into the cup C a part is driven by the descent of the plunger into the mold-cavity B, forming the blank E, (shown in Fig. 2,) attached to a mass of glass $e$, that has been left in the cup and which is separated from the blank after they have been removed from the mold and returned to the pot or furnace.

The blanks E are produced in large numbers and may be pressed one at a time, or the press-mold A may have a number of blank-cavities, so that a number of blanks may be pressed at once.

After the blanks have been pressed, as above described, they are allowed to cool naturally and at a subsequent period are placed on pins $f\,f$, projecting from a chain F, that is mounted on sprocket-wheels G G' and that travels through a long narrow chamber H, which is heated from one end by a gas-burner I or in any other suitable manner. The pins $f\,f$ may be arranged in pairs or groups transversely of the chain, or two or more chains may be arranged side by side in the chamber. The blanks being placed on the chain and the latter propelled in the direction of the arrow by turning a handle $g$ on the shaft of sprocket-wheel G, the blanks are moved gradually from the cooler to the hotter end of the chamber, and thus gradually heated, and when heated to the desired extent are removed one at a time or in pairs or groups through an opening L in the side of the chamber and placed on the ends of blow-snaps and, if necessary, are still further heated at the glory-hole M and then taken to the molds, Figs. 5 or 6, and blown therein to completed form, preferably by compressed air conveyed from a suitable source through a pipe N, having a mouthpiece O, adapted to fit over the end of the hollow blow-snap P, and a cock Q, by means of which the flow of air may be regulated.

The mold shown in Fig. 6 is designed for blowing lamp-chimneys, and after the blank has been blown in the mold to the form shown in the figure, which shows the glass in the mold, the mold is opened and the glass removed and cracked off on the lines $x\,x$ and $y\,Y$ and the sharp edges left by the cracking-off operation fire-glazed at the glory-hole or in other convenient manner.

After the articles have been formed in the molds, Figs. 5 and 6, they are taken to a leer and properly annealed.

From the above description it will be observed that our method can be practiced without the assistance of skilled workmen, the various steps of gathering the glass, pressing the blanks, placing them in the reheating-furnace, and blowing them to completed form in a mold being easily accomplished and requiring so little skill or training that substantially the entire method can be carried out with the assistance of a few untrained laborers or boys.

The only step in the method that requires the services of any one that might be classed above a laborer or gathering boy is that of pressing the blanks, and this work, as is well known, requires but a modicum of the skill required in the blowing of glass or finishing of the same and may be readily learned by any person of ordinary intelligence in a very short time.

Where the manufacture is conducted under our method, the manufacturer is relieved of the necessity of keeping large stocks of all the varieties of articles which he makes on hand, it being only necessary to keep in stock certain lines of blanks, each size of which is adapted to be made up into a variety of articles, so that as the demand arises the articles may be produced in large variety from a limited number of styles of blanks.

Having described our invention, we claim—

1. The method of manufacturing glassware, consisting in pressing blanks, then allowing the same to become cold without annealing, then gradually reheating them and finally blowing them to completed form.

2. The method of manufacturing glassware, consisting in pressing blanks of suitable form, allowing the same to become cold and then without annealing heating a number of them gradually and simultaneously and finally finishing them severally.

3. The method of manufacturing glassware consisting in pressing blanks of suitable form, allowing the same to become cold without annealing, then reheating a number of them gradually and simultaneously then successively blowing them to completed form.

4. The method of manufacturing glassware consisting in pressing blanks of suitable form, allowing the same to become cold without annealing, reheating a number of the blanks simultaneously, blowing them successively to form articles from a part of the mass of glass contained in the blanks and then cracking off the completed article from the rest of the blank.

In testimony whereof we have affixed our signatures in presence of witnesses.

JOHN I. ARBOGAST.
CHARLES V. ARBOGAST.
FRANCIS J. ARBOGAST.
FREDERICK L. ARBOGAST.
PHILIP R. ARBOGAST.

Witnesses to signatures of John I., Charles V., and Frederick L. Arbogast:
Jos. B. Connolly,
A. A. Connolly.

Witnesses to signatures of Francis J. and Philip R. Arbogast:
A. P. Byrne,
Katie McArdle.